United States Patent [19]

Mach

[11] Patent Number: 4,487,766

[45] Date of Patent: Dec. 11, 1984

[54] GROWTH STIMULANTS AND COMPOSITIONS CONTAINING SAME

[75] Inventor: Walter J. Mach, Kirchseon, Fed. Rep. of Germany

[73] Assignee: Lohmann Tierernahrung GmbH, Cuxhaven, Fed. Rep. of Germany

[21] Appl. No.: 469,129

[22] Filed: Feb. 23, 1983

[30] Foreign Application Priority Data

Feb. 26, 1982 [DE] Fed. Rep. of Germany ....... 3206911

[51] Int. Cl.$^3$ .......... C07H 1/00; C07H 37/00; A61K 31/715
[52] U.S. Cl. ..................... 424/180; 536/1.1; 536/121; 536/124; 530/500; 530/506
[58] Field of Search .............. 424/180; 536/1.1, 124, 536/121; 260/124

[56] References Cited

FOREIGN PATENT DOCUMENTS

| | | |
|---|---|---|
| 967052 | 5/1975 | Canada . |
| 638305 | 10/1936 | Fed. Rep. of Germany ...... 260/124 |
| 228550 | 12/1943 | Fed. Rep. of Germany . |
| 891790 | 10/1953 | Fed. Rep. of Germany . |
| 194053 | 6/1982 | New Zealand .................... 424/180 |

OTHER PUBLICATIONS

Bregeault, "Chem. Abst.", vol. 67, 1967, p. 12755(w).
Bellemare et al., "Chem. Abst.", vol. 97, 1982, p. 40495z.

*Primary Examiner*—Johnnie R. Brown
*Attorney, Agent, or Firm*—Cushman, Darby & Cushman

[57] ABSTRACT

Biochemically active materials having anabolic bioactivity for favorably influencing the intracellular and systemic metabolism of higher organisms are disclosed. The materials consist of water-soluble acid carbonization products of lignoid natural materials in the form of decationized alkali salts and have their catabolic activity at least in part inhibited by reaction with trace metal ions. The active material carbonization products are produced by treating lignoid natural material with an aqueous alkali hydroxide solution. The resulting solution is adjusted to a weakly acid pH and treated with a trace metal salt solution. The reaction mixture thus obtained was dried, optionally after addition of a suitable carrier product. Also described are growth-promoting agents, particularly suited for animal feed supplements, as well as therapeutic agents which contain this active material useful in treating metabolism disturbances of higher organisms or for use with disturbances of the metabolism.

13 Claims, 1 Drawing Figure

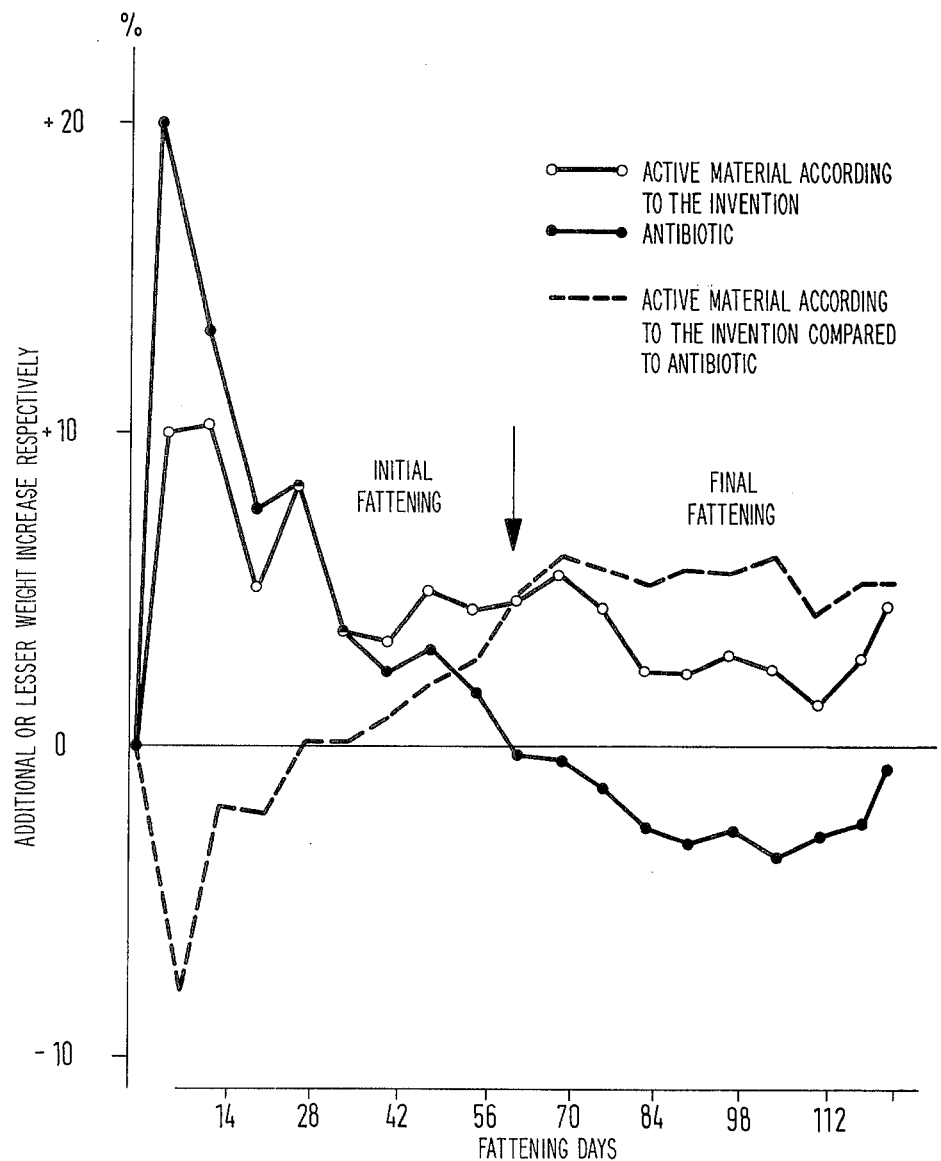

GROWTH STIMULANTS AND COMPOSITIONS CONTAINING SAME

BACKGROUND OF THE INVENTION

The present invention is directed to a biochemically active material, its production and an agent containing this active material.

Materials promoting growth, the so-called "growth stimulants", are typically employed in the feeding of animals for producing quicker growth and increased meat tissue production. The known growth promoting materials may be categorized as either antibiotics, synthetic chemical growth promoters or sexual hormones. The use of sexual hormones as growth promoters in the feeding of animals is forbidden by law in some countries, inter alia because of the sexual specificity, and as a result there have been several proposals for alternative materials. Thus, for example, plant extracts with possibly suitable properties, "phytoadaptogens", e.g. from *Eleutherococcus senticosus*, were recently tested; see Kaemerer et al, Der Praktische Tierarzt 9/1980, pages 748-760. However, limits are placed on the production of these types of growth promoters because of the very large amounts of plant starting material necessary to supply the quantities required. For example, if only 1% of this type of growth promoter is added to only 10% of the mixed poultry feed consumed in the Federal Republic of Germany, about 350,000 kg of Elutherococcus, on a dry weight basis, must be produced. Furthermore, the properties of such plant extracts vary in potency and desired result from crop to crop depending on the conditions of cultivation, harvesting, and type of plant growth; further considerable land areas are needed for cultivation.

A further group of plant materials coming into question, according to W. J. Mach, Die Ernaehrungsumschau 7 (1971) pp. 259-260, are the postmortal occurring, radical secondary products of reaction of the type of melanoidins, i.e. dark substances formed by the interaction of reducing sugars and amino acids when heated. This reaction is sometimes called the Maillard reaction. The knowledge of these materials leads inter alia to investigations over the chemism of postmortal compounds in brown hay which is said to cause an increased desire for food; see Handbuch der Futtermittel, Vol. 1, P. Parey, Berlin, (1967), but which has not yet been employed systematically.

The process of producing brown hay is indeed very difficult to control and no longer has any industrial significance. However, when the process is carried out as Emmerling was able to show more than 100 years ago, aromatic-quinoid secondary products result according to the principle of the reaction with nascent quinones, and these products too are considered to be melanoidins. Thus the term "melanoidin" stands for a collective concept of browned products as they occur, for example for the heating of many nutrients, either as desired or undesired reaction products; see Ernaehrungs-Umschau 1971, p. 295. As such they are poorly isolatable forms of postmortal plant secondary reaction products, sometimes called radical condensation products, which can have structural units having unpaired electrons that are detectable by ESR spectroscopy. Melanoidins furthermore can be found by intestinal bacteria under physiological conditions from plant ballast material, provided that it contains lignin; see Dirscherl, Revue Roumaine de Biochemie 1, (1966).

Natural materials which belong to the large and chemically ill-defined group of melanoidins are also found in relatively small amounts and different chemical properties in coffee extracts, bacterial cultures, e.g. *B. subtilis, E. coli,* among others, and in cultures of lower fungii such as actinomycelis. Furthermore melanoidins can be produced synthetically by chemical irradiation, e.g. UV+tyrosine. Such materials are also found in certain fermenting or rotting products such as in peat, beer and in many plant extracts. Most of these raw materials, however, are unsuited for industrial use, since they do not give industrial yields or are unsuited either chemically and/or physically.

Exhaustive work on the clarification of the human therapeutic effects on the digestive tract and the metabolism of melanoidins such as coffee melanoidins (Ernaehrungs Umschau, loc. cit.), so-called "carbo coffeae" and the "butter tea" of Tibet, however, show that the anti-hepatoxic activity of the group of materials of this type, the melanoidin acids, alone are not suited for growth promotion. The property of brown or burning hay to increase the desire for food is probably more a matter of physiological effect due to the aroma than a true growth promotion effect.

According to Schole in a publication based on a lecture held in Cuxhaven on Oct. 21, 1981 in the Federal Republic of Germany, the growth promoting activity of anabolic materials depends primarily on the ability of a material to stimulate the synthesis metabolism of cells, liberated by the reduction of the activity of radical forming enzymes in the membrane system of the cells. These radical forming enzymes, by oxidation of the sensitive SH-enzyme contained in all cytoplasmatic and nuclear synthesis cycles, limit the synthesis metabolism. The cell redox systems, e.g. the glutathione system, must provide for the protection of the SH-enzyme. However, if the radical forming membrane enzyme is blocked by factors supplied from outside the system then the synthesis metabolism of the cells is increased through activation of the synthesis cycles in the cytoplasm and cell nucleus. As anobilic factors there are considered materials which, in turn, represent active redox, electron donor-acceptor systems. The increased synthesis metabolism in turn requires an increased amount of energy in the form of adenosine triphosphate (ATP). To guarantee this energy a hormonal counter reaction is liberated in the organism in the presence of an intensified synthesis metabolism. The catabolically acting hormone of the adrenal cortex as well as thyroxine provide for the breakdown of reserve material and therewith for the manufacture of ATP. The cells thus then are capable of optimal output if an anobilic factor reduces the enzyme radical retarding the synthesis metabolism and simultaneously provides for catabolic factors, namely for sufficient ATP, provided no exceeding catabolic hormone or other reaction occurs.

It has now been found that experimentally comprehensible metabolism regulation effects (adaptogen activity) of plant growth promoters depend on the coexistence of both catabolically and anabolically active structural elements. Experiments show that the fine tuning of anabolic and catabolic activities of a plant growth promoter suited for the rearing of animals is an unconditional prerequisite.

Based on these experiments a renewed investigation of water-soluble melanoidins was undertaken, that is the alkali salt of the melanoidin acid after cation exchange that form a truly water soluble material in the pH range of 7.0 to 5.0. Surprisingly the anabolic and catabolic activity of lignoid melanoidins having anabolically and catabolically active structural units, comprising aromatic quinoid, resorbable secondary products of radical condensation reactions, can be selectively controlled to be equalized, while the catabolic activity is definitely inhibited. Without this controlled equalization of the anabolic and catabolic activities a permanent growth increase in the rearing of animals through the use of lignoid melanoidins as growth promoters is not obtained. It has further been found that the carbonized products of natural lignoid materials suited for use in the invention contain structural units of the quinone, semiquinone and quinhydrone type, and have unpaired electrons detectable through ESR spectroscopy.

BRIEF DESCRIPTION OF THE DRAWING

FIG. 1 is illustrating the positive (increase) and negative (decrease) weight gain comparing the active material of the present invention, an antibiotic feed supplement, and a comparison of the two opposite a zero control group.

DETAILED DESCRIPTION OF THE INVENTION

According the present invention a biochemically active material having anabolic bioactivity capable of positively influencing the intracellular and systemic metabolism of higher organisms is disclosed. This material consists of water soluble, acid carbonization products of lignoid natural materials in the form of decationized alkali salts, whose undesirable catabolic activity is definitely inhibited with trace metal ions. The present invention also includes a process for the production of this active material and a food additive or formulation containing it.

The biochemically active material of the present invention is extracted from natural or synthetic forms of carbonization of lignin-containing natural materials such as deciduous trees, conifers or grasses, using with an aqueous alkali hydroxide solution, i.e. sodium, potassium, lithium, ammonium, preferably potassium hydroxide, as the extrant. The extraction is conducted at a temperature of about 5° to about 35° C., preferably about 15° to about 25° C. (e.g. room temperature). Undissolved, suspended materials are removed from the extract by a suitable process, e.g. centrifuging or decanting. Then the extract is kept at about 5° to 35° C., preferably 15° to 25° C. (e.g. room temperature) for about 3 to 60 days, preferably 5 to 30 days. Longer storage times should be avoided as the final product usually tends to have a lower activity. The extract, which is always highly alkaline at a pH of about 13, for example, is then adjusted to a weakly acid pH, preferably about 5.0 to 6.5. Preferably this is done by portionwise addition of a strongly acidic ion exchanger, e.g. Amberlite IR 120, in the hydrogen form; the ion exchanger is then removed after the desired pH is reached. Subsequently the dry material content of the weakly acid solution is determined.

Next the weakly acid solution is treated with a trace element salt solution. Suitable solutions are the salts, especially chlorides, of essential trace elements such as cobalt, iron, copper, nickel, manganese and/or zinc; the cobalt salts are preferred. The concentration of the metal solution preferably is 0.1 to 0.5 molar. On the basis my investigations of the reaction starting from the addition of the metal salts (conductivity measurements begin at this point) the melanoidins form chelate complexes with the added metal ions which leads to a decrease in the intensity of the ESR signal. While not wishing to be bound to any particular theory or mode of operation, evidently the catabolically active structural elements of the melanoidin are blocked through some type of a complex formation. In principal other metals also are usable in place of the above-mentioned essential trace metals, assuming that the metal(s) selected is physiologically acceptable and is capable of blocking the undesired catabolic activity.

In general, a complete blocking of the catabolic activity of the melanoidins does not lead to the desired increase in growth, as described above. Therefore, the reaction of the melanoidins with the metal salt solution preferably is only carried out to the extent that a partial blocking of the catabolic activity of the melanoidins occurs. The expression "definite inhibition" as used herein means primarily a partial blocking of the catabolic activity, but also includes a complete blocking of the catabolically active structural units, and practically complete disappearance of the ESR signal, depending upon the type of animal and other factors as discussed below.

Partial blocking can optionally be achieved by mixing together batches that are completely or almost completely blocked batches with unblocked batches in the desired ratio. This procedure simplifies production and decreases the amount of extract to be reacted with the trace metal salt solution. Further, this procedure permits convenient production of a predetermined product after determining the optimum degree of blocking.

Since the deionized lignoid melanoidins are extremely complicated structured, multi-variant redox systems and the intracellular metabolism regulation effect comprises an extremely complex biological electron reaction chain as well, it is not possible to quantitatively define chemically the catabolic activity of these compounds. Nor is it possible to find a linear relationship between the desired growth promoting effect at a given dosage rate in the animal feed and the degree of the chelate conditioned ETU inhibition (electron transfer units=electron transfer systems of lignoid structure, whose presence is responsible for the catabolic activity). Rather, one will ascertain a purely experimental animal-determined agreement between the presupposed type of melanoidin and the degree of the metal chelate conditioned inactivation of the catabolic activity. However, it is assumed in all cases that the melanoidin used is identifiable via free radicals detectable through ESR spectroscopy.

The concept of the catabolic activity thus it is not a matter of quantitatively and chemically fixed size, but rather of the assessment of a biological activity which is essentially species-dependent on the type of animal and also is dependent on other factors, such as for example the amount of the active material of the invention in the feed. In other words, this means that while the catabolic activity is qualitatively detectable through the presence of the ESR-signal, but is not quantitatively physically detectable. Therefore, one skilled in the art will use emperical techniques in animal experiments using lignoid carbonization products having different metal contents. In this way it is possible for the skilled worker, following the descriptive information given herein, to ascertain for each type of animal and each chelating metal the optimal partial blocking of the catabolic activity, that is the optimal metal content of the active material of the invention, without the need to establish quantitatively the catabolic activity of the starting material.

In order to provide reproducible ratios, one starts by determining the dry material content of the melanoidin solution before addition of the metal salt solution. For example, this may be accomplished by evaporating a sample of the solution using infrared drying at surface temperatures having a maximum of 75° C. and ascertaining the amount of solids remaining behind. Then melanoidin solutions having previously ascertained dry material content are mixed with different amounts of metal salt solutions of known concentrations so that a range of samples having different ratios of melanoidin dry material to metal salt or metal ions are produced. Animal experiments will demonstrate that both too high as well as too low values for the dry material ratio (or of the metal content of the active material of the invention) result in no, or at least not the optimal, increase in growth. It was found, for example, using lignite as starting material and cobalt as trace metal that the dry material ratio must be at 17.3 (to 1 gram solids of the melanoidin solution 58 mg of $CoCl_2.6H_2O$ was added), in order that swine fed the material attained optimal increases in growth at a feed concentration of 50 parts per million (ppm).

The active material of the present invention is recovered from the reaction mixture resulting after addition of the metal salt solution by careful concentration at a maximum of 75° C. and/or by freeze drying. Alternatively the drying can be carried out together with a suitable carrier material, such as corn spike flour, wheat flour, other post milled products or customary inorganic carrier materials. Usually the portion of carrier material is 50 to 95%, and preferably 80 to 90%. At higher concentrations of active material before feeding further mixings are necessary since otherwise the small content of active material in the feed, for example 50 ppm, cannot be reliably established.

As starting materials optionally there can also be used the other melanoidin-containing materials mentioned above, provided that they exhibit a sufficient content of free radicals and permit a partial blocking of the catabolic activity through reaction with metal salt solutions. Besides melanoidins also suitable according to the present invention are lignin melanoidin acids obtained through biotechnological reaction of wood flour or straw flour e.g. prepared pre-decomposed or rotted products. In addition a synthetic carbonization form of "carbonized" deciduous tree lignin, which is obtained through alkaline reaction in the presence of oxygen supplied by hydrogen peroxide and separation of the peptized fractions, may be used.

PREPARATION OF THE ACTIVE INGREDIENTS OF THE INVENTION

The invention will be further illustrated with reference to the following process of production and the product so obtained. Lignite powder at room temperature in 0.4 molar KOH solution under stirring is converted into the soluble potassium salt and after 24 hours through solids separation by centrifuge or decantation, solids are removed from the alkali insoluble portion. The sediment is rejected, while the overlying solution is observed for about 28 days then a sample is withdrawn from the supernatant and a dry material determination carried out through infrared drying at surface temperatures of at most 75° C., after previously deionizing the highly alkaline (pH 12–13) alkali lignite solution by means of a highly acid synthetic ion exchange resin (Amberlite IR-120) in the $H^+$ form and in this manner bringing it to a pH of 5.5. Subsequently 2.423 ml of a 0.1 molar cobalt (II) chloride solution is added at 20° C. under stirring to 100 ml of a 1% acid lignite melanoidin solution. The reaction ends after 10 minutes. The resulting acid solution, which contains a lignite cobalt chelate, is then carefully dried e.g. in air at temperatures of not over 75° C. or through freeze drying, and can be further processed by mixing with suitable carrier materials, other customary additives and additional active materials. Advantageously the carrier material can also be added before concentration of the lignite cobalt chelate solution so that the lignite cobalt chelate is retained on the carrier material after the drying. In this procedure a fluidized bed-spray drying procedure, for example using an organic carrier has proven to be well suited.

Solutions obtained by cold extraction at a pH of about 7.2, e.g. with 100 ml demineralized water rendered weakly alkaline per 3 grams of powdered sample from the pre-mix of the lignite cobalt chelate and carrier, show a UV-spectrum between about 190 and 500 mm without characteristic maxima. However, the fluorescence-emission spectra have a peak between 369 and 548 nm, the maximum being at 450 nm and having a well developed shoulder at 500 nm. Further, these solutions lead to a variation of the absorption spectrum of methylene blue in the redox test, i.e. the positions of the maxima and their peak heights are changed, indicating the formation of leucomethylene-blue due to a redox reaction. Similarly the absorbtion spectrum of neutral red is changed when reacted with these solutions. Corresponding results are also obtained with similarly prepared lignite chelates of the other metals mentioned above.

The materials of the present invention have demonstrated an increase in growth, that is more growth feeding the materials of the present invention compared to growth in the zero controls, in growth experiments with rats and swine. This is reported in more detail in Examples 3 to 6. Similar effects are observed with fowl, calves, ruminants and other agriculturally useful meat-producing animals. The term "useful animals" is also meant to include animals grown primarily for their fur.

Based on its influence on the synthesis metabolism of the cells, the active material of the invention is also suited for therapeutic use in humans and animals in the treatment of metabolism imbalances. Thus especially with breeding animals, which are limited in their natural freedom of movement, by using the active material of the present invention better bone formation is achieved and in the case of fur bearing animals a nicer pelt results. In the area of human medicine the active materials of the invention are considered useful, inter alia, to enhance the healing of broken bones, such as for instance in athletes.

Besides the above-described orally administered/-consumed form the active material of the present invention can also be dispensed in the form of injectable preparation, thus for example in a sterile aqueous solution for injection. Other forms of administration may be used as well.

EXAMPLES OF THE INVENTION

The invention will now be explained in more detail below in connection wit the following examples in which, unless otherwise indicated all parts and percentages are by weight and all temperatures are in degrees centigrade. The compositions can comprise, consist essentially of or consist of the materials set forth and the process or method can comprise, consist essentially of or consist of the steps set forth with such materials.

EXAMPLE 1

Lignite powder (600 g) was converted at room temperature in 10 liters of a 0.4 molar KOH solution with stirring into the soluble potassium salt and after 24 hours freed from the alkali-insoluble portion by separating the solids. The sediment was rejected.

After four weeks at room temperature the supernatant (centrifugate) was brought to a weakly acid pH of about 5.5 through the portionwise addition of the strongly acid synthetic ion exchange resin Amberlite IR-120 pract in the $H^+$ form. After separation of the ion exchanger, a 20 ml sample was withdrawn and a dry material determination carried out by infrared drying the sample at surface temperature of at most 75° C. In addition a sample was investigated ESR-spectroscopically for the control of the existence of stable, free radicals.

Subsequently the exchange-treated supernatant was reacted with a cobalt (II) chloride solution as follows: at 20° C. under stirring 2.423 ml of a 0.1 molar cobalt (II) chloride solution was added to 100 ml of a 1% acid lignite melanoidin solution.

Since the acid lignite melanoidin possess a dry material content of 3.29%, according to the above instructions 7.971 ml of a 0.1 molar cobalt (II) chloride solution was added under stirring at 20° C. to 100 ml of solution. Thus to 3.29 grams of dry material of the lignite melanoidin solution 0.187 grams of $CoCl_2.6H_2O$ was added. The ratio is about 58 mg $CoCl_2.6H_2O$ per gram of dry material of the lignite melanoidin solution.

The resulting acidic lignite cobalt chelate solution gave an ESR signal (one line spectrum) of 4.6 Gauss peak width at a magnetic field strength of 3357.8 Gauss using a Varian model E-12 spectrometer made by Varian, Palo Alto, Calif. at 100 HZ frequency modulation, 2 MW microwave energy.

The thus obtained acid lignite cobalt chelate solution may be dried either at temperatures of less than 75° C. using a customary carrier material through spray drying, without carrier material, or through freeze drying. The test material remaining behind was employed as the active material in the animal feeding investigations described below.

EXAMPLE 2

The procedure described in Example 1 yielded an acid lignite melanoidin solution having a dry material content of 2.83%. This solution was treated under the conditions given in Example 1 with 8.57 ml of a 0.1 molar cobalt (II) chloride solution. Thus 0.204 g of $CoCl_2.6H_2O$ (about 72 mg $CoCl_2.6H_2O$/g dry material of the lignite melanoidin solution) were added to 2.83 grams dry material of the lignite melanoidin solution. This means that the cobalt content of the material in Example 1 was about 25% lower than in the present example.

The acid lignite cobalt chelate solution was dried as described in Example 1.

EXAMPLE 3

Feeding experiments with Sprague Dawley and SPF Wister rats are reported in this example. The animals were adapted for a period of 7 days to the diet used in the laboratory facility or institute (see Table 1) and to the experimental conditions. Next the animals were collected into groups case of 8 to 10 animals of the same strain and having about the same starting weight. In this manner three experimental groups were formed which were fed the institute diet ad libitum with an addition of the active material produced according to Example 2. The optimum dosage was determined in preliminary experiments and was 32 mg active material/kg feed. At the beginning of the experiment the animals on the average weighed about 70 g. A corresponding zero control of 18 or 19 animals each was allotted to each group.

The active material was bound to wheat flour and was stored at 4° C. until mixing into the animal feed base.

The experiment lasted for 17 days. The animals were weighed at the beginning and at the end of the experiment and the increase in weight of those animals fed the active material was compared with that of the corresponding control animals. The results are summarized in Table 2. The average increase in weight within the three experimental groups compared to the control groups in each case was 7.8%, 9.9% and 5.7%, respectively.

TABLE 1

| Green Breeding Feed | |
|---|---|
| 44% | coarse ground wheat |
| 33% | coarse ground corn |
| 15% | coarse ground soy beans |
| 3% | skim milk powder |
| 2% | green alfalfa flour |
| 2% | mineral mixture* |
| 1% | vitamin mixture** |
| 100% | |
| *40% | calcium carbonate for feed |
| 30% | calcium phosphate for feed |
| 24.5% | cattle sate |
| 5% | magnesium phosphate |
| 0.5% | trace elements |
| | Fe:Cu:Mn:Co was 5:1.5:1:0.2 |
| 100% | |
| Vitamin mixture for Green Breeding Feed** | |
| vitamin A | 2000 IE |
| vitamin $D_3$ | 20 IE |
| vitamin E | 30 mg |
| vitamin $K_3$ | 2 mg |
| vitamin $B_1$ | 4 mg |
| vitamin $B_2$ | 6 mg |
| vitamin $B_6$ | 4 mg |
| Ca—pantothenate | 8 mg |
| nicotinic acid | 8 mg |
| cholic acid | 200 mg |
| folic acid | 1 mg |
| inositol | 1 mg |
| biotin | 80 mg |
| bound to wheat flour | |

TABLE 2

| Group | | Number of animals | Weight increase (g) | % additional weight increase using the active material of Example 2 |
|---|---|---|---|---|
| I | Control animals | 18 | 100.9 ± 11.1 | 7.8 |
| | Experiment animals | 9 | 108.0 ± 14.9 | |
| II | Control animals | 18 | 86.6 ± 10.5 | 9.9 |
| | Experiment animals | 9 | 95.6 ± 9.4 | |
| III | Control animals | 19 | 86.6 ± 7.1 | 5.7 |
| | Experiment animals | 10 | 91.6 ± 11.8 | |

EXAMPLE 4

The active material produced according to Example 1 was tested while maintaining the experimental conditions described in Example 3. The duration of the experiment was 21 days, the dosage 50 mg active material/kg feed. However, only one group of animals was observed in comparison to a control group.

The results are summarized in Table 3. The average increase in weight of the experimental animals compared to the control animals was 4.67%.

TABLE 3

| Group | Number of animals | Increase in (g) | % additional weight increase using the active material of Example 1 |
|---|---|---|---|
| Control animals | 20 | 119.9 ± 7.2 | 4.67 |
| Experiment animals | 10 | 125.5 ± 4.5 | |

EXAMPLE 15

The active material according to the present invention was produced according to the process described in Example 1. The potassium lignite solution, however, was fractionated by column chromatography over a Sephadex molecular sieve before the deionization and the fractions having a molecular size greater than 24,000 rejected. In this example for the catabolic blocking of the thus obtained potassium lignite about 25% less cobalt (II) chloride was used than described in Example 1. The additional procedures for obtaining the end product corresponded to those of Example 1.

The product was tested while maintaining the test conditions described in Example 3. The dosage was 14 mg active material/kg feed. The experimental results are summarized in Table 4. The average increase in weight within the three experimental groups compared to that of control group in each case was 5.0%, 9.1% and 4.9%, respectively.

TABLE 4

| Group | | Number of animals | Increase in (g) | % additional weight increase using the active material of Example 5 |
|---|---|---|---|---|
| I | Control animals | 18 | 100.9 ± 11.1 | 5.0 |
| | Experiment animals | 9 | 106.0 ± 9.3 | |
| II | Control animals | 18 | 86.6 ± 10.5 | 9.1 |
| | Experiment animals | 9 | 94.5 ± 14.4 | |
| III | Control animals | 18 | 86.6 ± 7.1 | 4.9 |
| | Experiment animals | 9 | 90.9 ± 9.0 | |

EXAMPLE 6

Swine fattening experiments were carried out with piglets having an average beginning weight of 15 kg. In each case 5 animals were provided in a stall covered with straw. Feed and water were offered ad libitum. A beginning fattening diet up to an average weight of 50 kg/animal was provided and subsequently up to the slaughtering a final fattening feed having the composition given in Table 5.

Five male and female animals were collected and arranged into an experimental group. To this group was dispensed feed with an addition of 50 mg active material according to Example 1 per kg of their feed. The active material was bound to a carrier material made of 16.7% corn spike flour and 83.3% of corn zein fodder "fines" and was stored until use at 4° C.

A group of 9 animals served as the zero control group. To the feed of these animals only the carrier material (see Table 5) in the corresponding amount was added. In addition a positive control group was established and to their feed 20 mg of an antibiotic/kg feed was added in place of the active material of the invention.

TABLE 5

| Feed Composition | | |
|---|---|---|
| Feed Components | Beginning Feed (%) | Final Feed (%) |
| Coarse barley meal | 37.50 | 31.78 |
| coarse oat meal | 5.00 | 15.00 |
| coarse corn meal | 7.00 | 10.00 |
| coarse wheat meal | 24.00 | 19.00 |
| coarse soybean meal | 17.50 | 11.00 |
| wheat bran | 5.70 | 15.00 |
| mineral mixture "Teutonia II/a" without Vitamin and "active-material" addition | 2.00 | 2.00 |
| active material mixture growth promoter or carrier material (zero control) | 1.00 | 1.00 |
| Rovimix - 428 | 0.22 | 0.22 |
| | 100% | 100% |
| raw protein (%) | 16.6 | 14.6 |
| raw fiber (%) | 4.7 | 5.5 |
| total nutrients (%) | 71.1 | 69.6 |
| Vitamin mixture bound to wheat (post) flour | Vitamin addition in mg ($\mu$g; IE)/kg Final Feed Mixture | |
| Vitamin A (IE) | 2000 | |
| Vitamin $D_3$ (IE) | 400 | |
| Vitamin E | 3 | |
| Vitamin $B_1$ | 0.4 | |
| Vitamin $B_2$ | 1.2 | |
| Vitamin $B_6$ | 0.8 | |
| Vitamin $B_{12}$ ($\mu$g) | 4 | |
| Vitamin $K_3$ | 0.8 | |
| Ca—Pantothenate | 2.4 | |
| Nicotinic acid | 8 | |
| Folic acid | 0.2 | |
| Inositol | 1 | |

TABLE 5-continued

| | Feed Composition | |
|---|---|---|
| Feed Components | Beginning Feed (%) | Final Feed (%) |
| Biotin (μg) | 80 | |

The experiment lasted 123 days. The animals were weighed at the beginning of the experiment and once a week thereafter. The development of weight of the experimental animals was compared with the zero as well as the positive control groups.

The experimental results are summarized in Table 6 and FIG. 1.

TABLE 6

| Group | Number of animals | Increase in weight (g) | percent additional increase in comparison to zero control animals |
|---|---|---|---|
| Zero control animals | 9 | 83.9 ± 9.4 | none |
| Antibiotic-control animals | 10 | 83.3 ± 8.0 | −0.7 |
| Experimental animals active material mixture of Example 1 | 10 | 87.7 ± 12.6 | +4.5 |

The active material produced according to Example 1 compared to the zero controls up to the end of the experiment effected an extra weight increase of about 5%, while the antibiotic control group was in general agreement with the controls. From FIG. 1, in which the experimental results are represented graphically, it is clear that during the first week of the experiment the antibiotic gave an extra weight increase of 20%, while that of the active material of the present invention only was 10%. Until administration of the final feed began, the growth value for the antibiotic was comparable to the zero control while the group fed with the active material of the present invention maintained an extra overall increase of about 5% up to the end of the experiment.

The effect of the antibiotic was probably compensated for within 7 or 8 weeks by a slow onset increase of corticosteroid or tyroxine production, while in the case of the active material of the present invention evidently a permanent extra increase occurred by avoiding the endogenic manufacture of catabolic factors through the simultaneous supply of a tissue unspecific, catabolic factor.

What is claimed is:

1. Process for producing a growth-promoting composition consisting of a water-soluble acid carbonization material in the form of decationized alkali salts, said process comprising the successive steps of:
    (1) treating the carbonization product of a naturally-occurring lignin material with an aqueous alkaline solution;
    (2) removing and discarding any suspended matter from the resulting solution;
    (3) decationizing the solution of step (2) by adjusting the pH of the solution until it is weakly acidic;
    (4) treating the decationized solution with an amount of a trace metal salt solution sufficient to partially inhibit the catabolic activity of the carbonization product of lignin, and
    (5) drying the resulting reaction mixture at a temperature of at most about 75° C.

2. The process according to claim 1 in which lignite is the natural carbonization product used in step (1).

3. The process according to claim 1 in which the lignin material is treated with an aqueous alkali hydroxide solution in step (1), and the pH of the solution in step (3) is adjusted by contacting said solution with a strongly acidic ion exchange in the hydrogen form to remove any alkali metal ions.

4. The process according to claim 1 in which the pH is adjusted in step (3) to about 5.0 to about 6.5.

5. The process according to claim 1 in which the trace metal salt solution is cobalt, iron, copper, nickel, manganese or zinc.

6. The process according to claim 5 in which the solution contains about 5 to about 50 mg of cobalt/g on a dry weight basis.

7. The process according to claim 6 in which the dried product step (5) contains about 13.0 to 17.5 mg of cobalt/g on a dry weight basis.

8. The process according to claim 1 in which the reaction mixture is dried in step (5) on a compatible carrier material.

9. The process according to claim 1 in which the reaction mixture is dried by freeze drying.

10. A growth-inducing composition containing as the active ingredient the product produced by the process of claim 1.

11. A food or feed additive composition for promoting the growth of aminals to which it is administered comprising a growth-inducing quantity of the composition of claim 10 together with an animal feed.

12. An animal feed containing growth nutrients, vitamins and minerals together with a growth-promoting amount of the feed additive of claim 10.

13. The method of promoting growth in an animal comprising administering to said animal a growth-promoting amount of the feed additive of claim 12 together with animal growth nutrients.

* * * * *